(12) United States Patent
Goto et al.

(10) Patent No.: US 8,603,350 B2
(45) Date of Patent: Dec. 10, 2013

(54) METHOD OF MANUFACTURING SUBSTRATE FOR INFORMATION STORAGE MEDIA

(75) Inventors: Naoyuki Goto, Kanagawa (JP); Toshitaka Yagi, Kanagawa (JP); Yutaka Yamashita, Kanagawa (JP)

(73) Assignee: Ohara inc., Kanagawa (JP)

( * ) Notice: Subject to any disclaimer, the term of this patent is extended or adjusted under 35 U.S.C. 154(b) by 355 days.

(21) Appl. No.: 12/836,238

(22) Filed: Jul. 14, 2010

(65) Prior Publication Data
US 2011/0011833 A1 Jan. 20, 2011

(30) Foreign Application Priority Data

| Jul. 17, 2009 | (JP) | 2009-169595 |
| Jul. 17, 2009 | (JP) | 2009-169596 |
| Jun. 21, 2010 | (JP) | 2010-140482 |
| Jun. 21, 2010 | (JP) | 2010-140588 |

(51) Int. Cl.
*C03C 15/02* (2006.01)
*B24B 1/00* (2006.01)

(52) U.S. Cl.
USPC .................... 216/52; 216/89; 216/97; 451/41

(58) Field of Classification Search
None
See application file for complete search history.

(56) References Cited

U.S. PATENT DOCUMENTS

| 5,476,821 A | 12/1995 | Beall et al. |
| 6,296,553 B1 | 10/2001 | Nishi et al. |
| 7,189,151 B2 * | 3/2007 | Takeuchi et al. ............... 451/259 |
| 7,494,519 B2 * | 2/2009 | Fletcher et al. ................. 51/295 |
| 7,753,143 B1 * | 7/2010 | Miess et al. .................... 175/374 |
| 7,771,498 B2 * | 8/2010 | Sung ................................ 51/295 |
| 8,092,560 B2 * | 1/2012 | Inaba et al. ..................... 51/295 |
| 8,226,737 B2 * | 7/2012 | Lugg et al. ...................... 51/309 |
| 2002/0126421 A1 * | 9/2002 | Takahashi et al. ............. 360/313 |
| 2002/0160689 A1 * | 10/2002 | Benning et al. ................... 451/5 |
| 2003/0217989 A1 * | 11/2003 | Benning et al. ................. 216/41 |
| 2004/0235406 A1 * | 11/2004 | Duescher ....................... 451/527 |
| 2005/0074635 A1 * | 4/2005 | Mitani et al. ............ 428/694 ST |

(Continued)

FOREIGN PATENT DOCUMENTS

| JP | 07-300340 | 11/1995 |
| JP | 8-147688 A | 6/1996 |

(Continued)

OTHER PUBLICATIONS

The Crystallographic Society of Japan "Crystal Analysis Handbook", Editors Compilation, "Crystal Analysis Handbook", Kyoritsu Shuppan Co., Ltd. Sep. 1999, pp. 492-499 (Partial Translation).

(Continued)

*Primary Examiner* — Allan Olsen
(74) *Attorney, Agent, or Firm* — Hoffmann & Baron, LLP (57) ABSTRACT

A manufacturing method is provided for manufacturing a substrate for information storage media having various properties that are demanded for a next generation of information storage media substrate purposes exemplified by perpendicular magnetic recording systems, etc., and above all, having high fracture toughness and a smooth surface at low cost. The method of manufacturing a substrate for information storage media includes a step of preparing glass material of a plate shape containing $SiO_2$ component, $Al_2O_3$ component, and $R'_2O$ component, R' being at least one selected from Li, Na, and K, and the step of lapping includes at least one sub-step of lapping the glass material with a diamond pad.

20 Claims, 2 Drawing Sheets

(56) References Cited

U.S. PATENT DOCUMENTS

| | | | |
|---|---|---|---|
| 2005/0101230 A1* | 5/2005 | Yoshikawa et al. | 451/41 |
| 2005/0176351 A1* | 8/2005 | Singh, Jr. | 451/28 |
| 2005/0241239 A1* | 11/2005 | Sung | 51/308 |
| 2006/0021973 A1* | 2/2006 | Guthrie et al. | 216/88 |
| 2006/0042317 A1* | 3/2006 | Miyamoto | 65/61 |
| 2006/0169667 A1* | 8/2006 | Koyata et al. | 216/52 |
| 2006/0267023 A1* | 11/2006 | McBride | 257/77 |
| 2007/0003796 A1* | 1/2007 | Isono et al. | 428/832 |
| 2007/0026770 A1* | 2/2007 | Fletcher et al. | 451/41 |
| 2007/0026774 A1* | 2/2007 | Fletcher et al. | 451/528 |
| 2007/0082294 A1* | 4/2007 | Goto et al. | 430/270.12 |
| 2007/0093181 A1* | 4/2007 | Lugg et al. | 451/41 |
| 2007/0122548 A1* | 5/2007 | Inaba et al. | 427/180 |
| 2007/0184658 A1* | 8/2007 | Koyata et al. | 438/689 |
| 2007/0243421 A1* | 10/2007 | Machida et al. | 428/846.9 |
| 2008/0020238 A1* | 1/2008 | Tanaka et al. | 428/810 |
| 2008/0138721 A1* | 6/2008 | Hiramoto et al. | 430/5 |
| 2008/0153396 A1* | 6/2008 | Laconto et al. | 451/41 |
| 2008/0153397 A1* | 6/2008 | Laconto et al. | 451/41 |
| 2009/0042390 A1* | 2/2009 | Koyata et al. | 438/691 |
| 2009/0095414 A1* | 4/2009 | McBride | 156/273.7 |
| 2009/0163117 A1* | 6/2009 | Horie et al. | 451/41 |
| 2009/0286058 A1* | 11/2009 | Shibata et al. | 428/219 |
| 2010/0003904 A1* | 1/2010 | Duescher | 451/259 |
| 2010/0047970 A1* | 2/2010 | Eichelberger et al. | 438/121 |
| 2010/0068974 A1* | 3/2010 | Dumm et al. | 451/28 |
| 2010/0304029 A1* | 12/2010 | Huber | 427/289 |
| 2011/0135964 A1* | 6/2011 | Yagi et al. | 428/846.9 |
| 2011/0189505 A1* | 8/2011 | Ono et al. | 428/846.9 |
| 2011/0223838 A1* | 9/2011 | Duescher | 451/28 |
| 2011/0256803 A1* | 10/2011 | Boutaghou | 451/5 |
| 2012/0100786 A1* | 4/2012 | Haneda | 451/41 |

FOREIGN PATENT DOCUMENTS

| | | |
|---|---|---|
| JP | H9-77531 A | 3/1997 |
| JP | 10-328988 A | 12/1998 |
| JP | 2000-339672 A | 12/2000 |
| JP | 2001-269858 A | 10/2001 |
| JP | 2004-220719 | 8/2004 |
| JP | 2005272212 A | 10/2005 |
| JP | 2008-171472 A | 7/2008 |
| JP | 2008-254166 A | 10/2008 |
| JP | 2009-087439 A | 4/2009 |
| JP | 2009099249 A | 5/2009 |
| JP | 2009099250 A | 5/2009 |

OTHER PUBLICATIONS

Notice of Reasons for Rejections issued to JP Application No. 2010-140588, mailed Jan. 17, 2012.

English Machine Translation of Abstract for JP 2009-099249.

English Machine Translation of Abstract for JP 2009-099250.

English Machine Translation of Abstract for JP 2005-272212.

Communication dated Dec. 11, 2012 from a foreign patent office for a counterpart foreign application.

Notice of Reasons for Rejection issued to JP Application No. 2012-093865, mailed May 7, 2013.

English Machine Translation of JP10-328988 A.

English Machine Translation of JP2000-339672 A.

English Machine Translation of JP2008-254166 A.

Notice of Reasons for Rejection issued to JP Application No. 2012-093866, mailed Aug. 13, 2013.

English Machine Translation of JP H9-77531.

\* cited by examiner

METHOD OF MANUFACTURING SUBSTRATE FOR INFORMATION STORAGE MEDIA

This application is based on and claims the benefit of priority from Japanese Patent Application Nos. 2009-169595, 2010-140482, 2009-169596 and 2010-140588, respectively filed on 17 Jul. 2009, 21 Jun. 2010, 17 Jul. 2009 and 21 Jun. 2010, the contents of which are incorporated herein by reference.

BACKGROUND OF THE INVENTION

1. Field of the Invention

The present invention relates to a method of manufacturing a substrate for information storage media that has the necessary properties for future information storage media substrate purposes and, for example, to a method manufacturing a substrate for information storage media that deals with the increased density of future magnetic information storage media, is lower in specific gravity, high in Young's modulus, excels in fracture toughness, is extremely smooth in surface roughness after processing, excels in head sliding characteristics and impact resistance.

It should be noted that "information storage media" in the present invention indicates a magnetic information storage media that can be used in a hard disk for a variety of electronic devices.

2. Related Art

In recent years, for personal computers and various electronic devises, information storage devices of larger capacity have become necessary in order to handle large data files such as of video and sound. As a result, for magnetic information storage media, the demand for higher storage density has been raising year by year.

In order to handle this, the heat resistance of the substrate and smoothness of the surface in the next generation of magnetic storage systems have been demanded at levels that are high compared to existing substrates. In addition, possessing lowered specific gravity for reducing the load on the spindle motor, high mechanical strength for preventing crashing of the disk, and high fracture toughness to withstand impact with the head when the magnetic information storage fell down will become important still more than presently.

Furthermore, in recently years, since a part of the market of hard disks is being transferred to SSD (solid state drive), which are information storage devices employing flash memory, a much greater reduction in production cost has been demanded also in order to also appeal in unit cost per storage capacity, which is a significant over SSD.

For the materials used in substrates for information storage media, there are Al alloy substrates, glass substrates, crystallized glass substrates, etc.

Glass material substrates composed of glass and crystallized glass are superior in the aspect of the Vickers hardness being higher than Al alloy substrates, the aspect of having high surface smoothness, etc.; therefore, they are currently mostly used for purposes in which mobile use is assumed.

Glass material substrates are generally manufactured by the following method. Specifically, molten glass is formed by melting glass raw material, and this molten glass is formed into a plate shape. Herein, as a method of forming molten glass into a plate shape, there is a direct pressing method and a float method, which are methods of pressing molten glass. In the case of crystallized glass, crystals are caused to precipitate inside of the plate glass by heat treating. Next, a glass substrate or crystallized glass substrate is produced by processing the plate glass or crystallized glass into a disk shape, and carrying out a lapping process for bringing the plate thickness and flatness closer to the final shape, and a polishing process for obtaining a smooth surface texture.

Performing the lapping process using a loose grain method or fixed grain method is common practice conventionally. Herein, the loose grain method is performed by holding plate glass between upper and lower pressure plates, and moving relatively the pressure plates and plate glass by causing these to rotate, while supplying a slurry containing loose grains in a grinding fluid. In addition, the fixed grain method is performed by forming pellets from diamond particles using a bond such as resin, metal, and vitrified, and relatively moving the pressure plates and plate glass by causing these to rotate while supplying a grinding fluid (coolant) from the pressure plates in which these pellets are arranged in plurality.

The polishing process uses pressure plates to which polishing pads are adhered, and is performed by holding plate glass between the upper and lower pressure plates similarly to the lapping process, and relatively moving the pressure plates and plate glass by causing these to rotate while supplying a slurry containing loose grains composed of cerium oxide and the like.

The lapping process and the polishing process are performed separately in a plurality of stages and it is common for the abrasive to come to be smaller in each stage undergone.

If a substrate corresponding to a next generation of magnetic storage system were attempted to be produced with such a conventional manufacturing method, the following problem would arise. For example, in the case of a crystallized glass substrate, the type of crystalline phase precipitating to the glass phase, the grain size, and the amount of crystals largely affect the mechanical strength. Applying this fact, if the grain size and amount of crystals are controlled in order to raise the mechanical strength, and the precipitating crystalline phase is made to be crystals having high hardness, there have been problems in that the processing rates of lapping and polishing will deteriorate considerably or it will become difficult to obtain the smooth surface desired. The deterioration in processing rate is a primary factor greatly influencing an increase in manufacturing cost.

Cited Publication 1 discloses a substrate for information storage media composed of crystallized glass having a gahnite crystalline phase. If crystallized under the crystallization conditions disclosed in this publication, a substrate having a high degree of crystallinity will be obtained. Although this has high mechanical strength and high fracture toughness, the surface roughness thereof after polishing does not satisfy the level demanded for the next generation. In addition, the processing rates are low in the lapping process and polishing process due to the surface hardness being too high, and thus and an extended time period is required in the lapping process and polishing process. As a result, the yieldability of a substrate for information storage media is poor, and it is not possible to satisfy the demanded cost of the market.

Crystallized glass in which a spinel-type compound or a solid solution thereof is the main crystalline phase has previously been proposed as a material having high mechanical strength for application as information storage media substrate and structural material. However, it has been conventionally considered that having a high degree of crystallinity is necessary in order to have high mechanical strength. Therefore, the crystallized glass of gahnite type previously proposed has crystals that transmit almost no visible light precipitate, and has not obtained a surface texture to be applied as a substrate for a next generation of information storage media with a conventional processing method.

Cited Publication 2 discloses a substrate for information storage media composed of crystallized glass having an enstatite crystalline phase. Even if the crystallized glass disclosed in this publication is processed with a conventional processing method, due to the processing rate of the lapping process being low, the Ra of the surface texture is 0.2 nm to 0.3 nm after polishing; therefore, a smooth surface is not obtained.

Cited Publication 1: Japanese Unexamined Patent Application Publication No. H07-300340

Cited Publication 2: Japanese Unexamined Patent Application Publication No. 2004-220719

SUMMARY OF THE INVENTION

The object of the present invention is to provide a manufacturing method of manufacturing at low cost a substrate for information storage media including various properties that are demanded for next generation of information storage substrate purpose, exemplified by perpendicular magnetic recording systems, etc., and above all, having high fracture toughness and a smooth surface.

The present inventors have thoroughly researched to achieve the above-mentioned object, and as a result, found that the above-mentioned problems could be solved by a manufacturing method including a step of selecting glass of a plate shape containing a $SiO_2$ component, $Al_2O_3$ component, and $R'_2O$ component (provided that R' is at least one selected from Li, Na, and K) as glass materials, and preparing this, and a step of lapping in which this plate glass material (hereinafter may be referred to as "glass material") is ground with a diamond pad. The present invention specifically provides the following manufacturing method.

According to a first aspect of the present invention, a method of manufacturing a substrate for information storage media, includes steps of: preparing a glass material of a plate shape containing at least one component selected from the group consisting of $SiO_2$ component, $Al_2O_3$ component, and $R'_2O$ component, R' being at least one selected from the group consisting of Li, Na, and K; and lapping the glass material, in which the step of lapping includes at least one sub-step of lapping the glass material with a diamond pad.

According to a second aspect of the present invention, in the method of manufacturing a substrate for information storage media as described in the first aspect, lapping is performed with a diamond pad having an average diameter of diamond particles in the range of 0.1 to 5 µm, in a sub-step of lapping with the diamond pad.

According to a third aspect of the present invention, in the method of manufacturing a substrate for information storage media as described in the second aspect, lapping is performed with a diamond pad having an average diameter of diamond particles in the range of 2 to 5 µm, in a sub-step of lapping with the diamond pad.

According to a fourth aspect of the present invention, in the method of manufacturing a substrate for information storage media as described in the second aspect, lapping is performed with a diamond pad having an average diameter of diamond particles in the range of at least 0.1 µm to less than 2 µm, in a final sub-step of lapping with the diamond pad.

According to a fifth aspect of the present invention, in the method of manufacturing a substrate for information storage media as described in any one of the first to fourth aspects, the glass material is a material that precipitates as a crystalline phase having crystals with a Mohs hardness in the range of at least 6 to less than 10.

According to a sixth aspect of the present invention, in the method of manufacturing a substrate for information storage media as described in any one of the first to fifth aspects, the glass material contains at least one selected from the group consisting of $MAl_2O_4$ and $M_2TiO_4$ as a main crystalline phase, with M being at least one selected from Zn, Mg, and Fe, and is a crystallized glass having a crystal grain size of the main crystalline phase in the range of 0.5 nm to 20 nm, and having a degree of crystallinity of no more than 15%.

According to a seventh aspect of the present invention, in the method of manufacturing a substrate for information storage media as described in any one of the first to sixth aspects, the step of lapping includes at least one sub-step of lapping entirely with a diamond pad in a case in which t2/t1 is no more than 1.2, with t1 being a target thickness after final polishing has been completed, and t2 being a thickness of the glass material while processing.

According to an eighth aspect of the present invention, in the method of manufacturing a substrate for information storage media as described in any one of the first to seventh aspects, the glass material contains
40 to 60% of the $SiO_2$ component,
7 to 20% of the $Al_2O_3$ component, and
2 to 15% of the $R'_2O$ component, R' being at least one selected from the group consisting of Li, Na, and K, by mass on an oxide basis.

According to a ninth aspect of the present invention, in the method of manufacturing a substrate for information storage media as described in any one of the first to eighth aspects, the glass material contains
1 to 15% of $TiO_2$ component, and
5 to 35% of RO component, R being at least one selected from the group consisting of Mg, Ca, Sr, Ba, Zn, and Fe, by mass on an oxide basis.

According to a tenth aspect of the present invention, in the method of manufacturing a substrate for information storage media as described in any one of the first to ninth aspects, the glass material contains
5 to 25% of ZnO component by mass on an oxide basis.

According to an eleventh aspect of the present invention, in the method of manufacturing a substrate for information storage media as described in any one of the first to tenth aspects, the step of lapping employs a double-sided lapping-and-polishing machine that holds and polishes a material to be ground between upper and lower pressure plates, in which a maximum processing pressure thereof is in the range of 3 kPa to 6 kPa.

According to a twelfth aspect of the present invention, in the method of manufacturing a substrate for information storage media as described in any one of the first to eleventh aspects, a processing rate in the step of lapping is at least 5 µm per minute.

According to a thirteenth aspect of the present invention, in the method of manufacturing a substrate for information storage media as described in any one of the first to twelfth aspects, surface roughness Ra after the step of lapping has been completed is in the range of 0.001 µm to 0.085 µm.

The present inventors have thoroughly researched to achieve the above-mentioned object, and as a result, found that the above-mentioned problems could be solved by selecting a glass material of a plate shape containing at a $SiO_2$ component, $Al_2O_3$ component, and $R'_2O$ component (provided that R' is at least one selected from Li, Na, and K) as glass materials, and preparing this, and polishing the glass material of plate shape with a polishing slurry having a pH (hydrogen ion concentration) in a specified range. The present invention further provides the following manufacturing method.

According to a fourteenth aspect of the present invention, a method of manufacturing a substrate for information storage media, including: a step of preparing glass material of a plate shape containing $SiO_2$ component, $Al_2O_3$ component, and $R'_2O$ component, R' being at least of Li, Na, and K; a step of lapping the glass material; and a step of polishing the glass material, in which polishing is performed in the step of polishing with a polishing slurry having a pH in the range of 1 to 5 or in the range of 9 to 13. It should be noted that "step of lapping" may be the step of lapping described in the first to thirteenth aspects.

According to a fifteenth aspect of the present invention, the method of manufacturing a substrate for information storage media as described in the fourteenth aspect, in which the step of polishing includes a step of one stage.

According to a sixteenth aspect of the present invention, in the method of manufacturing a substrate for information storage media as described in the fourteenth aspect, the step of polishing includes a sub-step of at least two stages, and a pH of a polishing slurry used in a sub-step of a first stage is in the range of 9 to 13.

According to a seventeenth aspect of the present invention, in the method of manufacturing a substrate for information storage media as described in any one of the fourteenth to sixteenth aspects, the polishing slurry used in at least one sub-step of the step of polishing contains loose grains of cerium oxide.

According to an eighteenth aspect of the present invention, in the method of manufacturing a substrate for information storage media as described in the fourteenth to seventeenth aspects, the average grain size of loose grains of cerium oxide is in the range of 0.3 μm to 1 μm.

According to a nineteenth aspect of the present invention, in the method of manufacturing a substrate for information storage media as described in any one of the fourteenth to eighteenth aspects, the step of polishing employs a material containing loose grains of colloidal silica as a polishing slurry used in at least one sub-step.

According to a twentieth aspect of the present invention, in the method of manufacturing a substrate for information storage media as described in any one of the fourteenth to nineteenth aspects, grain size of the loose grains of colloidal silica is in the range of 10 nm to 100 nm.

According to a twenty-first aspect of the present invention, in the method of manufacturing a substrate for information storage media as described in any one of the fourteenth to twentieth aspects, the glass material contains at least one selected from the group consisting of $MAl_2O_4$ and $M_2TiO_4$, M being at least one selected from Zn, Mg, and Fe, as a main crystalline phase, and is a crystallized glass having a crystal grain size of the main crystalline phase in the range of 0.5 nm to 20 nm, a degree of crystallinity of no more than 15%, and a specific gravity of no more than 3.00.

According to a twenty-second aspect of the present invention, in the method of manufacturing a substrate for information storage media as described in any one of the fourteenth to twenty-first aspects, the glass material contains 40 to 60% of the $SiO_2$ component, 7 to 20% of the $Al_2O_3$ component, and 2 to 15% of the $R'_2O$ component, R' being at least one selected from the group consisting of Li, Na, and K, by mass on an oxide basis.

According to a twenty-third aspect of the present invention, in the method of manufacturing a substrate for information storage media as described in any one of the fourteenth to twenty-second aspects, the glass material contains 1 to 15% of $TiO_2$ component, and 5 to 35% of RO component, R being at least one selected from the group consisting of Mg, Ca, Sr, Ba, Zn, and Fe, by mass on an oxide basis.

According to a twenty-fourth aspect of the present invention, in the method of manufacturing a substrate for information storage media as described in any one of the fourteenth to twenty-third aspects, the glass material contains 5 to 25% of ZnO component by mass on an oxide basis.

According to a twenty-fifth aspect of the present invention, in the method of manufacturing a substrate for information storage media as described in any one of the fourteenth to twenty-fourth aspects, the step of polishing employs a double-sided lapping-and-polishing machine that holds and polishes a material to be ground between upper and lower pressure plates, in which a maximum processing pressure thereof is in the range of 8 kPa to 15 kPa.

According to a twenty-sixth aspect of the present invention, in the method of manufacturing a substrate for information storage media as described in any one of the fourteenth to twenty-fifth aspects, a processing rate in the step of polishing is in the range of 0.05 μm per minute to 1 μm per minute.

According to a twenty-seventh aspect of the present invention, in the method of manufacturing a substrate for information storage media as described in any one of the fourteenth to twenty-sixth aspect, surface roughness Ra after the step of polishing has been completed is no more than 1.5 Å.

According to the present invention, the processing time in the step of lapping is shortened even for a substrate high in mechanical strength such as that demanded for the purpose of a next generation of information storage media substrate. In addition, since the value of surface roughness Ra after the step of lapping had been completed is small, the processing time in the step of polishing is also shortened by necessary cut depth for obtaining the desired Ra value in the step of polishing being less. Moreover, even for such a substrate high in mechanical strength, polishing is possible at a high processing rate in the step of polishing, and a surface texture that is high in smoothness is obtained from the step of polishing. Therefore, a substrate for information storage media having various properties that are demanded for a next generation of information storage substrate purpose exemplified by perpendicular magnetic recording systems, etc., and above all, having high fracture toughness and a smooth surface, compared to a convention method, can be manufactured at low cost.

DETAILED DESCRIPTION OF THE INVENTION

Figure 1:
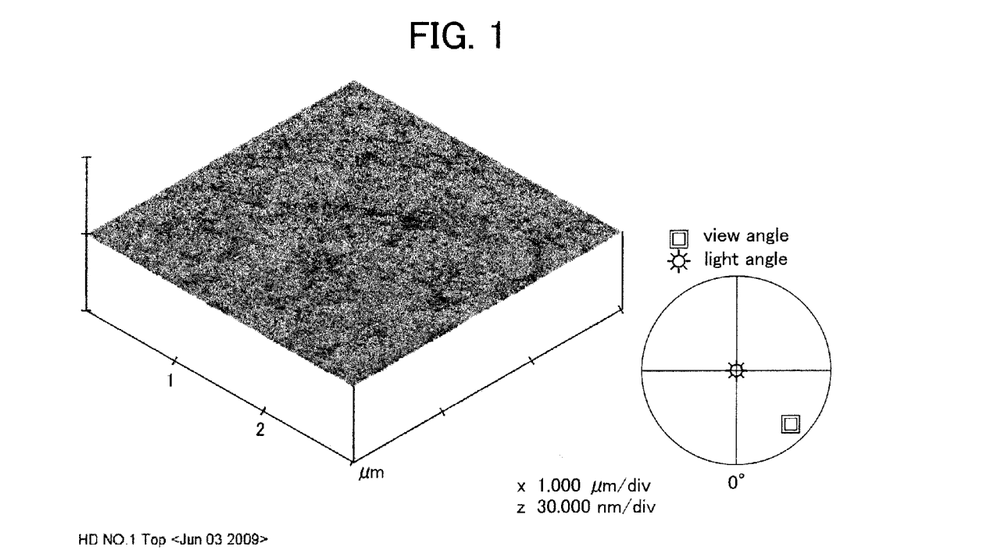
FIG. 1 is an AFM image of a surface of a substrate for information storage media obtained by way of the manufacturing method of the present invention.
Figure 2:
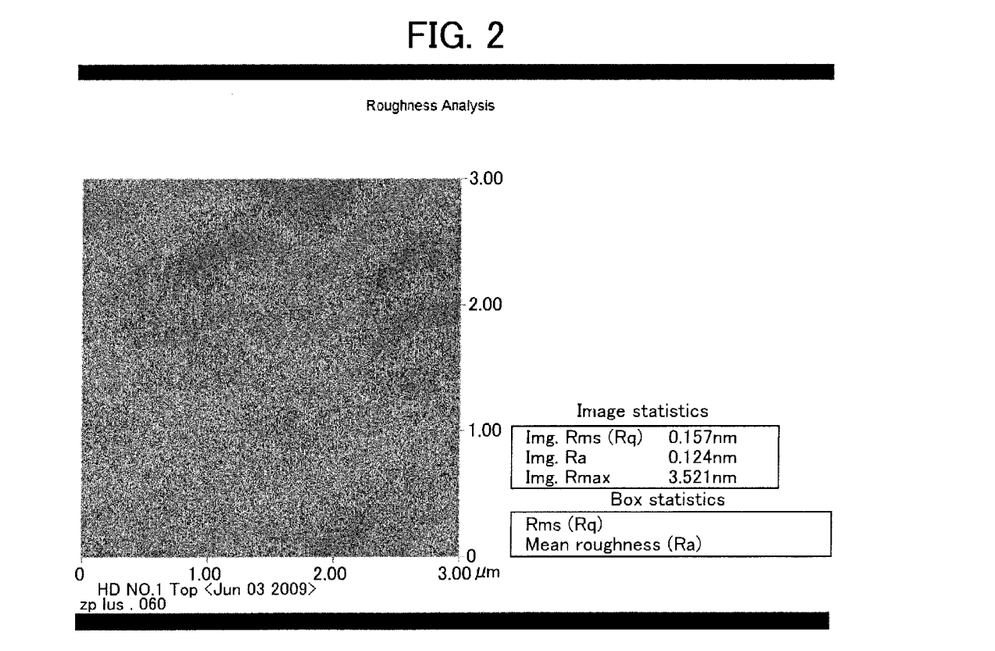
FIG. 2 is an AFM image of a surface of the substrate for information storage media obtained by way of the manufacturing method of the present invention.
Figure 3:
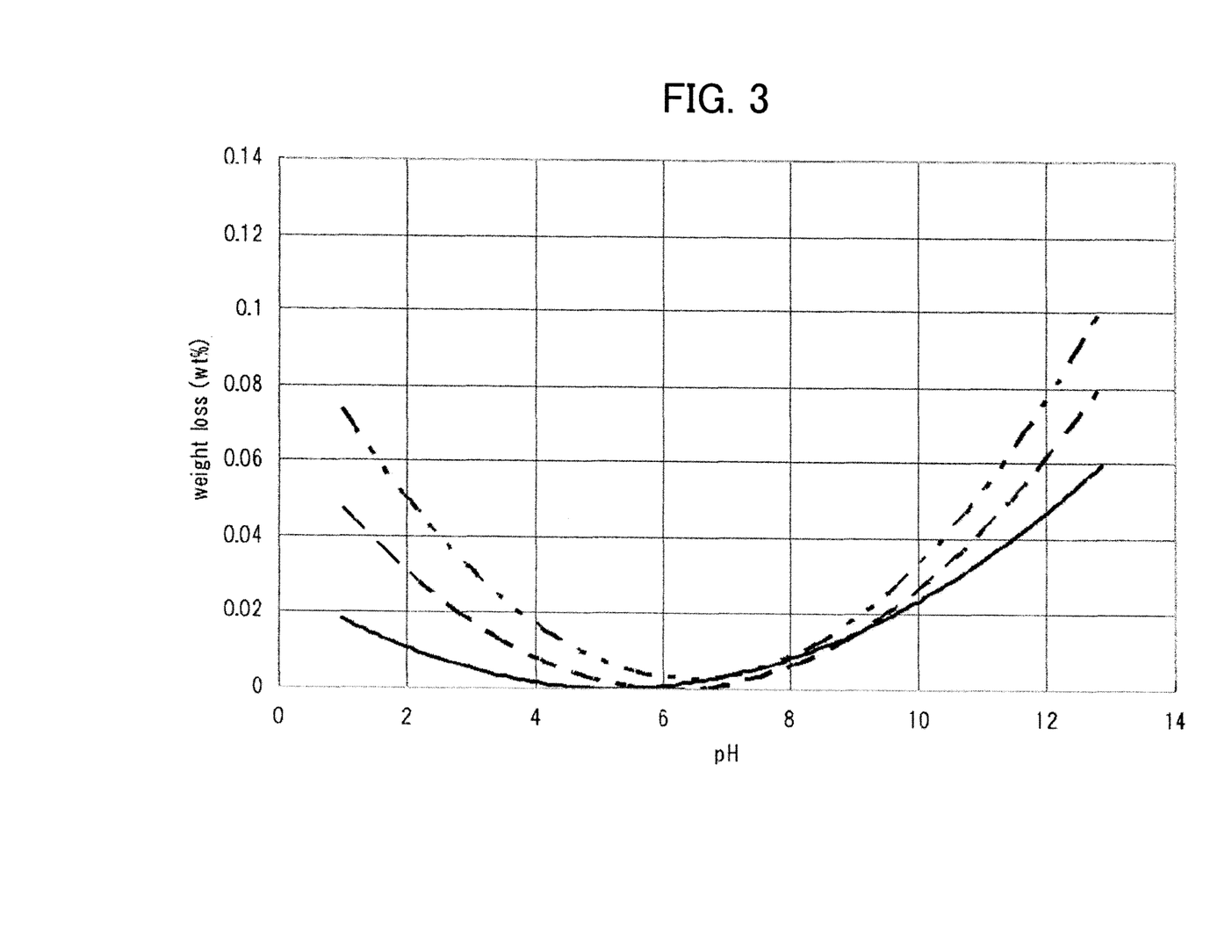
FIG. 3 is a graph showing the acid resistance ($HNO_3$ aqueous solution), water resistance, and alkali resistance (NaOH aqueous solution) of the substrate for information storage media of the present invention, with the solid line being G2, the two-dot line being G3, and the dotted line being G4.

In the present invention, "main crystalline phase" indicates a crystalline phase fitting the main peak (highest peak) in XRD diffraction.

"Degree of crystallinity" is obtained when summing the amount (percent by mass) of crystal calculated from the diffraction intensity obtained from powder XRD (X-ray diffraction) using the Rietveld method. The Rietveld method uses a method described in The Crystallographic Society of Japan "Crystal Analysis Handbook" Editors Compilation, "Crystal Analysis Handbook", Kyoritsu Shuppan Co., Ltd., 1999 September, pp. 492-499.

"Crystal grain size" is an average value of the longest distance when interposing with two parallel straight lines a crystal represented in an image of an arbitrary position acquired at a magnification of 100,000 to 500,000 by way of TEM (transmission electron microscopy). At this time, the number n is 100.

"Maximum crystal grain size" is the largest value of the longest distance when interposing with two parallel straight lines a crystal represented in an image of an arbitrary position acquired at a magnification of 100,000 to 500,000 by way of TEM (transmission electron microscopy). At this time, the number n is 100.

"Ra" indicates the average surface roughness stipulated in JIS B0601.

Vickers hardness is a value representing the hardness of a substrate surface, and specifically is a value obtained by measuring with the following method. That is, it is obtained by indenting for 15 second with 4.90 N on a diamond square-based pyramid indentor having an included angle of 136°, and by dividing a test weight of 4.90 (N) by a surface area (mm$^2$) calculated from the indentation lengths of the impression. In the measurement, a microscopic hardness tester MVK-E made by Akashi Seisakusho, Ltd. can be employed.

Mohs hardness is a value quantifying hardness based on how scratches appear relative to standardized materials. More specifically, if a scratch appears in a sample when the sample is sequentially drawn over a standardized material, it is measured as having a hardness lower than this standardized material. In order from soft material, the standardized materials are designated from 1 to 10. More specifically, 1 is talc, 2 is gypsum, 3 is calcite, 4 is fluorite, 5 is apatite, 6 is orthoclase, 7 is quartz, 8 is topaz, 9 is corundum, and 10 is diamond.

The properties demanded for a substrate for a next generation of information storage media are generally as follows.

Young's Modulus

In the field of information storage media disk substrates, advancement has been made in increasing the revolution speed and storage density for improving the data transfer rate. In order to deal with this trend, a substrate material must have high rigidity and low specific gravity since it is necessary to prevent disk vibration due to deflection when the revolution speed of the substrate material is high. In addition, in a case of being used in a portable storage device such as a removable storage device in particular, it is preferable to have mechanical strength to sufficiently withstand contact of the head, such as a high Young's modulus and surface hardness. Specifically, the Young's modulus is preferably set to at least 85 Gpa.

Young's Modulus (GPa)/Specific Gravity

In substrates for information storage media, if the specific gravity is large, despite being highly rigid, vibration will occur due to deflection generated when revolving at high speed from the mass thereof being high. Conversely, if the rigidity is low, even with low specific gravity, vibrations will similarly occur. Additionally, there is a problem in that electrical consumption will increase in accordance with an increase in mass. In addition, if the specific gravity is lowered excessively, it will become difficult to obtain the desired mechanical strength as a result. Therefore, it is necessary to get a balance of seemingly opposing properties of low specific gravity with high rigidity. Additionally, since there is a necessity to handle rising revolution speeds in the future, a preferred range of a value expressing the Young's modulus (GPa)/specific gravity is 31.4 and higher.

Fracture Toughness

The fracture toughness is an index representing the resistance to crack propagation with a slight weak point in the substrate surface as the origin. In particular, in a substrate for information storage media used in a next generation of hard disks, possessing high fracture toughness is required due to magnetic disk revolution speed having a trend of increasing speed. The fracture toughness ($K_{1C}$) uses a value obtained by the SEPB method (Single Edged Pre-cracked Beam: JIS R1607). The value $K_{1C}$ of fracture toughness is preferably at least 1.0, more preferably at least 1.1, and most preferably at least 1.2, in order for application as a substrate for a next generation of information storage media.

Specific Gravity

In order to improve the balance between the rigidity and specific gravity of the substrate produced by way of the manufacturing method of the present invention, it is preferable to set the specific gravity of the substrate to 3.00 or less, it is more preferable to set the specific gravity to 2.95 or less, and most preferable that it is 2.90 or less. On the other hand, since it will be substantially difficult to obtain a substrate having the desired rigidity if the specific gravity is below 2.45, it is preferable that the specific gravity is set to at least 2.45, more preferably set to at least 2.48, and most preferably set to at least 2.50

As a glass material to realize the above-mentioned properties, a glass or crystallized glass of a $SiO_2$ component, $Al_2O_3$ component, and $R'_2O$ component (provided that R' is at least one of Li, Na, and K) is selected in the present invention.

Then, by lapping this glass material using a diamond pad in at least one sub-process of a lapping process, a processing rate in the lapping process becomes high, and thus processing in a short time becomes possible. In addition, the value of surface roughness Ra when the lapping process is finished can be reduced. Therefore, it is also possible to shorten the processing time until achieving the desired surface roughness in a polishing process, and thus the overall processing time can be shortened.

Furthermore, after lapping the glass material, it is possible to obtain an extraordinarily smooth surface texture with a high processing rate by polishing with a pH of the polishing slurry employed in the polishing process in the range of 1 to 5 or 9 to 13.

For one skilled in the art of lapping processes such as of glass, a diamond pad is also called a diamond sheet, and is a pad in which diamond abrasive is fixed to resin of a sheet shape having flexibility. Grooves for supplying coolant to the lapping surface and discharging lapping dust are provided in the surface of the diamond pad. The grooves are provided in the shape of square blocks, spirals, radial lines, concentric circles, or a combination thereof.

The lapping process of the present invention may be divided into a plurality of sub-processes; however, in at least one sub-process, preferably the final sub-process, lapping is preferably performed with a diamond pad having an average diameter of diamond abrasive fixed thereto of 2 μm to 5 μm. By lapping using such a diamond pad, the processing time including the lapping process and the polishing process can be shortened in time since the value of the surface roughness Ra after the lapping process is finished can be lowered without causing the processing rate to deteriorate. An average diameter of the diamond abrasive that is more preferable for obtaining the aforementioned effect is 2 μm to 4.5 μm. The diamond abrasive fixed to the diamond pad is preferably 10 wt % or less. At this time, the average diameter of the abrasive of the diamond pad in the sub-process prior to the final sub-process is preferably set within the range of 6 µm to 10 µm.

In addition, in a case in which the polishing process (rough polishing process) of a first step performed conventionally is omitted, the glass material is preferably lapped with a diamond pad such as that having an average diameter of the diamond abrasive that is at least 0.1 µm and less than 2 µm in the final sub-process of the lapping process. Conventionally, the polishing process after the lapping process was divided into at least two stages, and the processes were performed while changing the type, average diameter, etc. of the abrasive in each stage. At this time, if the rough polishing process can be omitted, shortening of the manufacturing process will be possible, and thus a great cost savings can be realized. In the present invention, since a required surface smoothness in the rough polishing process can be obtained while maintaining the processing rate demanded in the lapping process by lapping with a diamond pad such as that having an average diameter of diamond abrasive of at least 0.1 µm and less than 2 µm, it becomes possible to omit the rough polishing process. For example, the polishing process can obtain the required surface texture as a substrate for information storage media even with only one stage. Herein, the average diameter of the diamond abrasive is more preferably at least 0.2 µm and no more than 1.8 µm. The result thereof is obvious in particular when processing a glass material (1) described later. It is believed that the glass material (1) described later having a property whereby it is difficult for scratches to occur is one of the main factors for the grindability (lapability) by the diamond pad. In this case, although there are no requirements, in order to make the efficiency of the overall process favorable, it is preferable to perform lapping with a diamond pad having an average diameter of the diamond abrasive of 2 µm to 5 µm in the sub-process prior to the final sub-process in the lapping process.

Therefore, the diamond pad used in the lapping process can employ a pad having an average diameter of diamond abrasive fixed thereto of 0.1 µm to 5 µm.

Herein, the average diameter of the diamond abrasive fixed to the diamond pad can have a value of d50 on a volumetric basis measured by a laser diffraction and scattering method. Although the average diameter of diamond abrasive is understood from the grain size distribution of diamond abrasive, which is regulated in the manufacturing stage usually, it can also be measured by melting the diamond pad in a chemical solution and only extracting the diamond abrasive.

In a case in which the glass material is crystallized glass, crystals of the glass material having a Mohs hardness of at least 6 and less than 10 are more preferably precipitated as the crystalline phase. When lapping the material to be ground using the diamond pad, clogging occurs in the diamond pad due to lapping dust of the material to be ground. In addition, as the lapping process proceeds further, the shape of the diamond pad grains exposed at the surface of the diamond pad end up being rounded. By lapping the glass material having crystal particles of the crystalline phase as described above with the diamond pad, the processing rate of the glass material is improved since an effect whereby lapping dust of the crystal particles broken away from the crystallized glass by lapping clogging the surface of the diamond pad is removed from the diamond pad and a dressing effect whereby the shape of the diamond particles exposed at the surface are made sharp are exerted. In order to more effectively obtain the aforementioned effects, the Mohs hardness of crystals contained in the crystalline phase more preferably exceeds 6, and most preferably is at least 7. However, if the Mohs hardness is excessively high, it will lead to it being difficult to obtain a smooth surface due to the processing rate of the glass material decreasing by the hardness of the glass material becoming high, and a large difference in processing rates arising between the glass phase and crystalline phase. Therefore, the Mohs hardness of crystals of the crystalline phase is most preferably no more than 9.

In particular, in a case in which the glass material is amorphous glass, in the lapping process in a range 1.2 times slimmer than the thickness of the glass material after the final polishing has been completed (target thickness), lapping is preferably performed with only the diamond pad, without performing lapping with the diamond pellets or lapping by a sanding method. Specifically, in the lapping process, when this target thickness is set to t1 and the thickness of the glass material during processing is set to t2, in a case in which t2/t1≤1.2, it is preferable to perform lapping entirely with the diamond pad. In the case of amorphous glass, when performing lapping by way of lapping with the diamond pellets and a sanding method in a range slimmer than 1.2 times the thickness of this target thickness, the surface roughness becomes inadequate before transitioning to the polishing process when ending the lapping process, and the processing time in the polishing process thereafter becomes long; therefore, the surface roughness required for the next generation of substrates is difficult to obtain.

The components of the plate glass material containing the aforementioned $SiO_2$ component, $Al_2O_3$ component and $R'_2O$ component will be explained below. When mentioning each constitutional component configuring the glass material in the present specification, in a case in which there is no particular description, the contents of each component will be represents in percent by mass on an oxide basis. Herein, "oxide basis" is a method of expressing the composition of each component contained in the glass material by assuming that oxides, carbonates, and the like used as raw materials of the constituent components of the glass material of the present invention are completely melted during melting and change to oxides being expressed, and expresses an amount of each component contained in the glass material with the total mass of these generated oxides as 100% by mass.

Glass Material (1)

The glass material (1) is crystallized glass in which at least one kind (hereinafter referred to as "spinel-type compound") selected from $MAl_2O_4$ and $M_2TiO_4$ (provided that M is at least one selected from Zn, Mg, and Fe) is the main crystalline phase. Gahnite and spinel ($MgAl_2O_4$) are difficult to distinguish since the peaks appear at the same angle in analysis by X-ray diffraction. This is similar for the case of $R_2TiO_4$ as well. In these cases, comparing the contents of the ZnO component and the MgO component in the composition of the crystallized glass, i.e. composition of the source glass, it is assumed that, if the ZnO component is abundant, a gahnite ($ZnAl_2O_4$) or a zinc titanate compound ($Zn_2TiO_4$) will be the main crystalline phase.

It is preferred that crystals composed of a spinel-type compound having a Mohs hardness of 8 because, when lapping crystallized glass in which a spinel-type compound is the main crystalline phase, the processing rate of the crystallized glass is considerably high from the aforementioned dressing effect of the diamond pad being remarkably apparent in particular.

The glass material of the present invention is preferably crystallized glass having a degree of crystallinity of a precipitated crystal of 1% to 15%, and a crystal grain size of 0.5 nm to 20 nm, in particular. The crystallized glass in which a spinel-type compound is the main crystalline phase can obtain exceptional mechanical strength due to the Mohs hardness of the spinel itself excelling at 8, as described above. Consequently, when the degree of crystallinity and crystal grain size of the precipitated crystal (containing precipitated crystals other than the main crystalline phase) are within the aforementioned ranges, by using the diamond pad specified by the present invention in the lapping process, a good balance between smoothness of the surface and mechanical strength such as Young's modulus, Vickers hardness and fracture toughness demanded in the next generation of substrates for information storage media can be obtained, and further, by making the balance of dressing effect of the diamond pad and processing rate in the lapping process to be favorable, it becomes possible to process the glass material at a high processing rate. If the degree of crystallinity becomes too large, it is difficult to obtain the desired surface texture, and it is easy for the processing rate to become inferior due to the hard crystalline phase being abundant relative to the glass phase. As a result, in order to obtain the above-mentioned effect, the degree of crystallinity is more preferably no more than 14%, and most preferably no more than 13%. Similarly, it is more preferable for the crystal grain size to be no more than 15 nm, and most preferable to be no more than 10 nm. Similarly, in order to obtain the above-mentioned effect, the maximum grain size of the main crystalline phase is preferably no more than 30 μm, more preferably no more than 20 μm, and most preferably no more than 15 μm.

The $SiO_2$ component forms a glass network structure, and is a required component in order to achieve an improvement in chemical stability and lowered specific gravity. With an amount thereof less than 40%, the glass obtained will be lacking in chemical durability, and the specific gravity tends to rise with an increase in the content of other components. Therefore, the lower limit for content is preferably 40%, more preferably 41%, and most preferably 42%. In addition, if the amount thereof exceeds 60%, it will be easy for melting and press molding to become difficult with a rise in viscosity, and it will be easy for the homogeneity and refining effect of the material to decline. Therefore, the upper limit for content is preferably 60%, more preferably 59%, and most preferably 58%.

The $Al_2O_3$ component is one of components constituting the main crystalline phase by way of heat treatment of the source glass, and an important component which contributes to stabilize glass and to improve the chemical durability, but the effect is poor when the content is less than 7%. Therefore, the lower limit for content is preferably 7%, more preferably 9%, and most preferably 11%. In addition, when the amount thereof exceeds 20%, contrarily, the meltability, moldability, and devitrification resistibility deteriorate, and the homogeneity and the refining effect tend to degrade. Therefore, the upper limit for content is preferably 20%, more preferably 19%, and most preferably 18%.

The RO components (provided that R is at least one selected from Ca, Sr, Ba, Zn, and Fe) are important components that each contribute also to the stabilization of glass, and include components that configure the main crystalline phase by way of heat treatment of the source glass. However, when the total amount thereof is lacking, the viscosity of the source glass becomes high, thereby harming the mass production characteristics, and also the desired crystalline phase is unlikely to be obtainable Therefore, the lower limit for content is preferably 5%, more preferably 8%, and most preferably 11%. On the other hand, if the total amount exceeds 35%, not only does vitrification become difficult, it will lead to precipitation of insoluble matter and rising of the devitrification temperature. Therefore, the upper limit for content is preferably 35%, more preferably 33%, and most preferably 31%.

The ZnO component is one of the components that configures the main crystalline phase formed by heat treatment of the source glass, and is an effective component in viscosity lowering of the glass as well as contributing to lower specific gravity and improved Young's modulus of the glass. However, if the content thereof is less than 5%, the above-mentioned effects will not be obtained. Therefore, the lower limit for content is preferably 5%, more preferably 6%, and most preferably 8%. In addition, if the content of the ZnO component exceeds 25%, precipitation of crystal from the source glass becomes unstable, and it becomes easy for the crystal grain size to be coarsen (coarsely large). Therefore, the upper limit for content is preferably 25%, more preferably 23%, and most preferably 21%.

The MgO component is a component that contributes to lowered specific gravity and improved Young's modulus of the glass, is an effective component in viscosity lowering of the glass, and can be added arbitrarily. However, if the content thereof exceeds 15%, not only the desired glass is unobtainable due to higher specific gravity of the raw glass but also insoluble matters may precipitate. Therefore, the upper limit for content is preferably 15%, more preferably 14%, and most preferably 13%.

The FeO component is one of the components that configures the main crystalline phase formed by heat treatment of the source glass, and generates a spinel-type compound with the $Al_2O_3$ component or $TiO_2$ component. In addition, it is a compound that also acts as a refining agent, but it will be alloyed with platinum, which is generally used during glass melting. Therefore, the upper limit for content is preferably 8%, more preferably 6%, and most preferably 4%.

The $TiO_2$ component is a component that configures the nucleus for causing the spinel-type compound to precipitate, and is a component that contributes to improvement of the Young's modulus, viscosity lowering, and improvement in the chemical durability of glass. Additionally, it is one of the components that configures the main crystalline phase formed by heat treatment of the source glass. However, if the added amount of this component exceeds 10%, the value for the specific gravity of the glass will be high, and further vertification will become difficult. Therefore, the upper limit for content is preferably 10%, more preferably 9%, and most preferably 8%. On the other hand, if the content of the $TiO_2$ component is less than 1%, nucleus formation by heat treatment will not occur. Therefore, the lower limit for content is preferably 1%, more preferably 2%, and most preferably 3%.

Similarly to the $TiO_2$ component, the $ZrO_2$ component is also a component fulfilling the role of forming a nucleus for causing the main crystalline phase to precipitate, and can be added arbitrarily due to contributing to improved Young's modulus and an improvement in the chemical durability of the glass. However, if the added amount of this component exceeds 10%, insoluble residues or $ZrSiO_4$ (zircon) tends to generate during glass melting, and the specific gravity of glass becomes higher. Therefore, the upper limit for content is preferably 10%, more preferably 8%, and most preferably 6%.

The $B_2O_3$ component can be added as an optional component since it contributes to viscosity lowering of the glass and improves the meltability and moldability. However, if this component is 8% or more, it will be difficult to satisfy the mechanical characteristics, and it will be easy for the source glass to phase separation and difficult to vitrify. Therefore, the upper limit of the content is preferably less than 8%. The upper limit is more preferably 7%.

The $R'_2O$ component (provided that R' is at least one selected from Li, Na, and K) is a component that brings about viscosity lowering, an improvement in moldability, and an improvement in homogeneity of the glass. In addition, when the $R'_2O$ component is included, an additional characteristic can be imparted by exchanging alkali metal ions of the surface after forming the substrate. If the content (total of each component of $Li_2O$, $Na_2O$, and $K_2O$) of the $R'_2O$ component is less than 2%, the above-mentioned effects can be obtained. Therefore, the lower limit for content is preferably 2%. In addition, since it is necessary to limit elution of alkali component from the surface of the substrate for information storage media, the upper limit for the content of $R_2O$ component is preferably 15%, more preferably 13%, and most preferably 11%, for the purpose of limiting the elution of alkali components to a minimum.

The individual contents of each component of $Li_2O$, $Na_2O$, and $K_2O$ will be explained.

The $Li_2O$ component is an optional component and the upper limit is preferably 2% since higher content thereof makes difficult to obtain the desired crystal phase.

The $Na_2O$ component is an optional component and the upper limit is preferably 15%, more preferably 12%, and most preferably 10% since higher content thereof makes it difficult to obtain the desired crystal phase.

The $K_2O$ component is an optional component and the upper limit is preferably 10%, more preferably 8%, and most preferably 5% since higher content thereof makes it difficult to obtain the desired crystal phase.

The CaO component is a component that contributes to lowered specific gravity and improved Young's modulus of the glass, and can be added as an optional component since it is an effective component also in viscosity lowering of the glass. However, if the CaO component exceeds 15%, the specific gravity of the source glass will rise and it will become difficult to obtain the desired glass. Therefore, the upper limit for content is preferably 15%, more preferably 12%, and most preferably 9%.

While the BaO component and the SrO component are components that act similarly to MgO, CaO, etc. as effective components in viscosity lowering of the glass, improving the chemical durability, and improving mechanical strength, they tend to raise the glass specific gravity. Therefore, the upper limit for content of each is preferably set to 5%, more preferably set to 4%, and most preferably set to 3%.

The $P_2O_5$ component can contribute to a rise in the Vickers hardness due to exerting an effect of suppressing crack propagation in the glass. In addition, it improves meltability of the source glass and refines the source glass by coexisting with $SiO_2$, as well as contributing to viscosity lowering. In order to obtain these effects, the $P_2O_5$ content can be set arbitrarily. However, if this component is added excessively, vitrification will become difficult, and thus denitrification and phase separation will occur easily. Therefore, the upper limit for content is preferably 7%, more preferably 6%, and most preferably 5%.

The $Gd_2O_3$, $La_2O_3$, $Y_2O_3$, $Nb_2O_5$, $Ga_2O_3$, and $WO_3$ components can be added as optional components due to contributing to an improvement in mechanical properties by improving Young's modulus, and to an improvement in heat resistance, but an increase in the added amount may also lead to a rise in specific gravity and a rise in raw material cost. Therefore, the total amount of at least one among these components is sufficient at up to 5%. If the total amount exceeds 5%, the specific gravity, Young's modulus, and specific rigidity cannot be satisfied. Therefore, the upper limit for the total amount of these components is preferably 5%, more preferably 4%, and most preferably 3%.

Components of V, Cu, Mn, Cr, Co, Mo, Ni, Te, Pr, Nd, Er, Eu, Sm, and the like, which are used as coloring components of the glass, distinguish the type of glass by applying fluorescence characteristics from these components, and can be added for the purpose of preventing mixture with glass of another type in a factory or the like. However, these components lead to a rise in specific gravity, rise in raw material cost, and a decline in glass formability. Therefore, the total amount of at least one among these components is sufficient at up to 5%. Therefore, the upper limit of the total amount of these components is preferably 5%, more preferably 4%, and most preferably 3% by oxide basis.

Glass Material (2)

A glass material (2) is an amorphous glass containing a $SiO_2$ component, $Al_2O_3$ component and $R'_2O$ component.

The $SiO_2$ component forms a glass network structure, and is a necessary component in order to achieve an improvement in chemical stability and lowered specific gravity. With an amount thereof less than 55%, the glass obtained will be lacking in chemical durability, and the specific gravity tends to rise with an increase in the content of other components. Therefore, the lower limit for content is preferably 55%, more preferably 57%, and most preferably 58%. In addition, if the amount thereof exceeds 80%, it will be easy for melting and press molding to become difficult with a rise in viscosity, a result of which it will be easy for the homogeneity and refining effect of the material to decline. Therefore, the upper limit for content is preferably 80%, more preferably 78%, and most preferably 77%.

The $Al_2O_3$ component is an important component that contributes also to stabilization and an improvement in chemical durability, but the effect is poor when the content is less than 2% Therefore, the lower limit for content is preferably 2%, more preferably 2.5%, and most preferably 3.4%. In addition, when the amount thereof exceeds 20%, contrarily, the meltability, moldability, and denitrification resistibility deteriorate, and the homogeneity and the refining effect tend to degrade. Therefore, the upper limit for content is preferably 20%, more preferably 19%, and most preferably 18.5%.

The $R'_2O$ component (provided that R' is at least one selected from Li, Na, and K) is a necessary component for viscosity lowering, improving moldability, improving homogeneity, and chemical strengthening. On the other hand, in the application of an information storage media substrate, it is preferable to raise chemical durability, i.e. to lower the amount of eluting alkali component as much as possible. The total amount of at least one of the $Li_2O$ component, $Na_2O$ component, and $K_2O$ component contained as needed, in order to set an eluting amount of alkali component that can be used as a next generation information storage media application exemplified by a perpendicular magnetic recording system or the like, is preferably no more than 20%, more preferably no more than 18%, and most preferably no more than 17%. On the other hand, the lower limit for the total amount of at least one of these is preferably at least 3%, more preferably at least 5%, and most preferably at least 8%.

The $P_2O_5$ component is a component that can be used as a nucleating agent in a case of forming crystallized glass by heat treating the glass, and can be arbitrarily added. This component is a component that improves meltability and refining of the source glass by coexisting with $SiO_2$ as well as contributing to viscosity lowering. However, if this component is added excessively, vitrification will become difficult, and thus denitrification and phase separation will occur easily. Therefore, the upper limit for content is preferably 3.0%, more preferably 2.7%, and most preferably 2.6%.

The $ZrO_2$ component contributes to an improvement in the chemical durability and physical properties of the glass, and can be arbitrarily added. However, if the added amount of this component exceeds 10%, insoluble residues or $ZrSiO_4$ (zircon) tends to generate during glass melting, and the specific gravity of glass becomes higher. Therefore, the upper limit for content is preferably 10%, more preferably 8%, and most preferably 6%.

The $B_2O_3$ component can be added as an optional component since it contributes to viscosity lowering of the glass and improves the meltability and moldability. However, if this component is 15% or more, it will be easy for the source glass to phase separation and difficult to vitrify. Therefore, the upper limit for content is preferably less than 15%. The upper limit is more preferably 12%, and further preferably 10%.

The BaO component and the SrO component can be added as effective components in viscosity lowering of the glass and improving the chemical durability as optional components, but if added excessively, the glass specific gravity will rise. Therefore, in order to set the specific gravity to an appropriate value, the upper limit for the respective content of the BaO component or the SrO component is preferably 15%, more preferably 14%, and most preferably 13%.

The MgO, CaO, and ZnO components can be added as optional components since they are effective in viscosity lowering of the glass. However, if MgO, CaO, or ZnO exceeds 20%, it will be easy for the glass denitrify. Therefore, the upper limit for the content of these is preferably 20% for MgO, 20% for CaO, and 20% for ZnO, a more preferable upper limit value is 15% for MgO, 15% for CaO, and 15% for ZnO, and an upper limit value that is further preferable is 8% for MgO, 10% for CaO , and 10% for ZnO.

The $TiO_2$ component can be arbitrarily added as a component that contributes to viscosity lowering and improvement in the chemical durability of glass. However, if the added amount of this component exceeds 10%, the specific gravity value of the glass will become high, and it will be difficult to vitrify. Therefore, the upper limit for content is preferably 10%, more preferably 8%, and most preferably 6%.

The $Gd_2O_3$, $La_2O_3$, $Y_2O_3$, $Nb_2O_5$, and $Ga_2O_3$ components can be added as optional components due to contributing to viscosity lowering of the glass, an improvement in mechanical properties by improving Young's modulus, and to an improvement in heat resistance, but an increase in the added amount may also lead to a rise in specific gravity and a rise in raw material cost. Therefore, the total amount of at least one among these components is sufficient at up to 15%. If the total amount exceeds 15%, vitrification and crystallization will become difficult. Therefore, the upper limit for the total amount of these components is preferably 15%, more preferably 10%, and most preferably 8%.

Components of V, Cu, Mn, Cr, Co, Mo, Ni, Fe, Te, Pr, Nd, Er, Eu, Sm, and the like, which are used as coloring components of the glass, can be added for the purpose of preventing mixture with another glass type in a factory or the like. However, these components lead to a rise in specific gravity, a rise in raw material cost, and a decline in glass formability. Therefore, the total amount of at least one among these components is sufficient at up to 5%. Therefore, the upper limit for the total amount of these components is preferably 5%, more preferably 4%, and most preferably 3% by oxide basis.

In order to obtain a high refining effect together with maintaining the properties demanded in substrates for information storage media, it is preferred that the glass materials (1) and (2) contain at least one component selected from the $SnO_2$ component and $CeO_2$ component as a main refining component. In order to obtain a high refining effect, the lower limit for content of the $SnO_2$ component, $CeO_2$ component, or the sum of both by oxide basis is preferably 0.01%, more preferably 0.1%, and most preferably 0.15%.

On the other hand, in order to lower specific gravity while maintaining mechanical strength, to obtain a high refining effect, and to raise the reboil suppressing effect during direct pressing, the upper limit for content of at least one selected from the $SnO_2$ component and $CeO_2$ component is preferably 1%, more preferably 0.8%, and most preferably 0.6%.

In the glass materials (1) and (2), the $As_2O_3$ component and $Sb_2O_3$ component, and the $Cl^-$ component, $NO^-$ component, $SO^{2-}$ component and $F^-$ component are components that act as refining agents, but since they are components that can be harmful to the environment, use thereof should be sparing. The glass of the present invention can obtain a refining effect even without containing the $As_2O_3$ component or $Sb_2O_3$ component, and further, in a case of these components and a refining agent component of the present application having been added, the refining effect would ultimately be offset by like refining agents.

Forsterite ($Mg_2SiO_4$), enstatite ($MgSiO_3$) and solid solutions of these, which are crystals that cause the polishing workability to deteriorate and the chemical durability to decline, are preferably not contained in the glass materials (1) and (2) of the present invention.

In addition, the glass substrate of the present invention is provided with a compressive stress layer at the surface, thereby obtaining an effect causing the mechanical strength to be improved.

The method of forming the compressive stress layer is exemplified by a chemical strengthening method of causing an exchange reaction between an alkali component existing in a surface layer of the glass substrate prior to formation of the compressive stress layer and an alkali component larger in ionic radius than this alkali component, for example. In addition, there is a thermal strengthening method of rapidly cooling the glass substrate after heating, and an ion implantation method of implanting ions into the surface layer of the glass substrate.

The chemical strengthening method is exemplified by the method of immersing in molten salt of a salt containing potassium or sodium, for example, potassium nitrate ($KNO_3$), sodium nitrate ($NaNO_3$), or a complex salt thereof at a temperature of 300 to 600° C. for 0.1 to 12 hours, for example. The lithium component ($Li^+$ion) existing in the glass component near the substrate surface develops an exchange reaction between the sodium component ($Na^+$ion) or the potassium component ($K^+$ion), which are alkali components having an ion radius larger than the lithium component, or the sodium component ($Na^+$ion) existing in the glass component near the substrate surface develops an exchange reaction between the potassium component, which is an alkali component having an ion radius larger than the sodium component, thereby causing a volume increase in the crystallized glass; therefore, compressive stress occurs in the surface layer of the glass substrate. As a result thereof, the ring bending strength, which is an index of impact characteristic, increased.

The thermal strengthening method, which is not particularly limited, is exemplified by the method of carrying out rapid cooling such as water cooling and/or air cooling after the glass substrate has been heated to 300° C. to 600° C., for example. This enables a compressive stress layer to be formed by the temperature difference between the surface and inside of the glass substrate. It should be noted that a compressive stress layer can be more effectively formed by combining with the above-mentioned chemical treatment method.

More specifically, the substrate for information storage media of the present invention is manufactured by the following method.

Processing to Prepare Plate Glass Material

First, raw materials of an oxide, carbonate, nitrate, etc. are mixed so as to contain the glass constituent components of the above-mentioned composition range, and then, using a normal melter in which a melting pot of platinum, quartz, or the like are used, the raw materials are melted at a temperature at which the viscosity of the glass melt was 1.5 to 3.0 dPa·S.

Next, the temperature of the glass melt is raised up to a temperature at which the viscosity is 1.0 to 2.3 dPa·S, and preferably 1.2 to 2.2 dPa·S, an agitation effect is brought about by causing foam to be generated in the glass melt, whereby the degree of homogeneity of the glass melt is improved.

Thereafter, the temperature of the glass melt is lowered to a temperature at which the viscosity is 1.8 to 2.6 dPa·S, and preferably 2.0 to 2.5 dPa·S, defoaming of the foam generated inside the glass and refining are performed, and then the temperature is maintained.

A disk shape with a thickness of about 0.7 mm to 1.2 mm is molded by dropping the molten glass manufactured at the above-mentioned conditions onto a lower mold, and pressing (direct press) the molten glass with the upper and lower molds.

More specifically, the temperature of the upper mold of the press molding tooling is set to 300±100° C., more preferably 300±50° C., and the temperature of the lower mold is set to Tg±50° C. of the glass, and preferably Tg±30° C.

Furthermore, the temperature of the glass effluent pipe for channeling glass from the melting pot to the press molding tooling is set to a temperature at which the viscosity of the glass is 2.0 to 2.6 dPa·S and more preferably 2.1 to 2.5 dPa·S, and glass of a predetermined amount is dropped onto the lower mold, and is pressed by causing the upper mold and lower mold to approach each other, thereby obtaining plate glass of a disk shape.

In addition, glass of a disk shape can be produced also by a method of slicing a glass body that has been molded in a cylindrical shape, a method of cutting out a glass sheet manufactured by a float method into a circular shape, or the like. However, from the point of manufacturing efficiency, manufacturing by direct pressing is most preferable.

Next, in a case of the glass material being made a crystallized glass, heat treatment is performed on the glass of a disk shape thus obtained, and crystals are made to form. This heat treatment is preferably performed at temperatures of two stages. In other words, first, a nucleation process is performed by heat treating at a first temperature, and after this nucleation process, a crystal growth process is performed by heat treating at a second temperature that is higher than that of the nucleation process.

In this crystal growth process, it is preferred that a setter made from ceramic of a disk shape and disk-shaped glass are piled together, sandwiching with the setter (number of setters equals the number of glass disks plus one), from the view point of improving the flatness of the disk.

The preferred conditions of heat treatment in order to attain the grain size and degree of crystallinity of precipitated crystals of the present invention are as follows.

The highest temperature of the first stage of heat treatment is preferably 600° C. to 750° C. The first stage of heat treatment may be omitted. The highest temperature of the second stage of heat treatment is preferably 650° C. to 850° C.

The holding time at the first temperature is preferably 1 to 10 hours.

The holding time at the second temperature is preferably 1 to 10 hours.

Preprocessing

Next, chamfering and shaping is carried out by drilling a central portion and end lapping of an outer-circumferential portion and an inner-circumferential portion.

Lapping Process

The lapping process is processing for bringing the desired plate thickness and flatness closer to the final shape, preferably employs a double-sided lapping-and-polishing machine that holds the plate glass material between upper and lower pressure plates, and causes these to move relatively by rotating the pressure plates. Although the lapping process may be a process of at least one stage, it is preferably divided into sub-processes of at least two stages, and the grit of the abrasive is preferably set to be finer as stages pass.

The sub-process of a first stage may be any one of a sanding method using loose grains such as alumina, a fixed grain method using diamond pellets, and a method using a diamond pad. In this case, the grit is preferably #800 to #1200 when using diamond pellets, and the average diameter of diamond abrasive is preferably 6 μm to 10 μm when using a diamond pad.

In addition, as described above, in a case of omitting a rough polishing process, the average diameter of the diamond abrasive of the diamond pad is preferably 2 μm to 5 μm. Moreover, the processing pressure of the sub-process of the first stage is preferably 3 kPa to 6 kPa, and more preferably 3.5 kPa to 5.5 kPa. The revolution speed of the pressure plates is preferably 20 to 50 rpm. The supply amount of coolant is preferably 0.5 cc to 1 cc for every 1 cm² of processing surface of the double-sided lapping-and-polishing machine.

Also including a case of the lapping process being only one stage, a diamond pad is used in the final sub-process. By using a diamond pad at least in the final sub-process, it is possible to shorten the processing time in which the lapping process and polishing process are included since the value of surface roughness Ra after the lapping process has been completed can be made small without adversely affecting the processing rate.

In this case, the average diameter of the diamond abrasive of the diamond pad is preferably 2 μm to 5 μm, and more preferably 2 μm to 4.5 μm. In addition, as described above, in the case of omitting the rough polishing process, the average diameter of the diamond abrasive of the diamond pad used in the final sub-process is preferably set to at least 0.1 μm and less than 2 μm, and more preferably set to 0.2 μm to 1.8 μm. This makes it possible to omit the polishing process of the first stage, i.e. the rough polishing process.

In addition, the processing pressure of the final sub-process is preferably 3 kPa to 6 kPa, and more preferably 3.5 kPa to 5.5 kPa. The revolution speed of the pressure plates is preferably 20 to 50 rpm. The supply amount of coolant is preferably 0.5 cc to 1 cc for every 1 cm² of processing surface of the double-sided lapping-and-polishing machine. Setting the surface roughness Ra of the glass material after the final sub-process has been completed to 0.001 μm to 0.085 μm, and more preferably to 0.003 μm to 0.085 μm is preferred from the point of view of integrating the time of the lapping process and the time of the polishing process, because the processing time can be shortened.

Inner- and Outer-Circumference Polishing Process

After the lapping process, polishing treatment is performed on an end face as needed, thereby making the surface of the end face smooth.

Polishing Process

After the lapping process or the inner- and outer-circumference polishing process, polishing of principal surfaces on the top and bottom of the glass material is performed, thereby making the surface texture to be the desired value. Although the polishing process may be a process of one stage, it is preferably divided into sub-processes of at least two stages. A rough polishing process, which is a process of a first stage, can be omitted by controlling the average diameter of the abrasive of the diamond pad as described above. Similarly to the lapping process, the polishing process also preferably employs a double-sided lapping-and-polishing machine, and uses loose grains such as of colloidal silica, cerium oxide, zirconia, alumina, or diamond, in which the grit of the abrasive is set to finer material and the polishing pad is set from a hard material to a soft material as each stage is undergone.

By making the surface roughness sufficiently smooth after the lapping process has been completed, it is also possible to make the polishing process to be only a final sub-process (finishing polish process).

The sub-process of the first stage (rough polishing process) employs a polishing pad, and preferably machines while supplying a polishing slurry containing loose grains of cerium oxide. The average grain size of loose grains in this case is preferably 0.3 μm to 1 μm. The content of loose grains contained in the polishing slurry can be appropriately adjusted between 5% by mass to 80% by mass. The polishing pad preferably uses material in which small cerium oxide abrasive are dispersed in hard urethane foam, or hard urethane foam. The hardness of the polishing pad is preferably 75 to 95 on the scale hardness according to JIS K 6253, and more preferably exceeds 85 and is no more than 95.

In addition, the pH of the polishing slurry is preferably set to 9 to 13, and most preferably set to 10 to 13. Normal polishing of the glass material is performed with the pH of the polishing slurry in a range near neutrality. This is because, if the pH of the polishing slurry is strongly acidic or alkaline, the chemical action will be excessively strong, leading to the surface of the glass material being rough. However, by setting the polishing slurry to the above-mentioned pH range, a high polishing processing rate is obtained while also obtaining a smooth surface texture for the glass material of the present invention. In particular, with crystallized glass in which a spinel-type compound forms the main crystalline phase, a high polishing rate is obtained.

In addition, the processing pressure of the sub-process of the first stage is preferably 8 kPa to 15 kPa, and more preferably 9 kPa to 13 kPa. The revolution speed of the pressure plates is preferably 20 to 50 rpm.

In this case, a processing rate of 0.3 μm per minute to 1 μm per minute can be obtained.

Also including a case of the polishing process being only one stage, a polishing pad is used in the final sub-process (finishing polish process), and processing is preferably performed while supplying a polishing slurry containing loose grains of cerium oxide or colloidal silica. The content of loose grains contained in the polishing slurry can be appropriately adjusted between 0.1% by mass and 60% by mass. The loose grains in this case preferably have a grain size distribution in the range of 10 nm to 100 nm. The polishing pad is preferably a polishing pad made of a soft non-woven fabric (Asker C hardness of preferably 55 to 80) or suede.

In addition, the pH of the polishing slurry is preferably set to 1 to 5 or 9 to 13, i.e. not in a range exceeding 5 to less than 9.

By setting to such a pH for the polishing slurry, the processing rate of the polishing process becomes high, and it becomes easier to obtain an extraordinarily smooth surface texture.

In addition, the processing pressure of the final sub-process is preferably 8 kPa to 15 kPa, and more preferably 9 kPa to 13 kPa. The revolution speed of the pressure plates is preferably 20 to 50 rpm.

With this process, a processing rate of 0.05 μm per minute to 0.20 μm per minute can be obtained.

In addition, two types of polishing slurries having different pH may be prepared, and may be set to pH differing before and after a sub-process. For example, a polishing slurry with a pH of 3 can be supplied from a polishing slurry tank A, then the supply of the polishing slurry is stopped and a rinse solution is supplied, after which a polishing slurry with a pH of 1 can be supplied from a tank B. It is possible to obtain a smoother surface texture while further improving the processing rate with this operation.

It should be noted that the particle size distribution of the loose grains is measured on a volumetric basis by way of a laser diffraction and scattering method, and the average grain size is set to a value of d50.

The pH of the polishing slurry may be adjusted by adding an acidic solution or alkaline solution such as nitric acid, sulfuric acid, acetic acid, organic acid, sodium hydroxide or an organic alkali to an abrasive compound slurry. Since the processing rate may change according to the composition of the glass material and type of solution even though the pH remains the same, it is able to select the most suitable solution.

In a case of configuring the supply of polishing slurry in the polishing process to be supply by circulation, the pH of the polishing slurry will gradually change due to the influence of polishing sludge. In such a case, a means may be provided for adding abovementioned acidic solution or alkaline solution for pH adjustment at an appropriate time. In this case, the addition of acidic solution or alkaline solution may be controlled using a signal from a pH measurement device.

According to the present invention, the surface roughness Ra after the final sub-process, i.e. finishing polish process, has been completed can be set to no more than 1.5 Å.

In addition, by treating with an acidic or alkaline solution after polishing, it is also possible to further lower the value of the surface roughness Ra.

EXAMPLES

Next, suitable examples of the present invention will be explained.

Process to Prepare Plate Glass Material

Raw materials of oxides and carbonates were mixed so as to make the composition in Table 1, these were melted at a temperature of about 1250 to 1450° C. using a melting pot made from quartz or platinum, and then the batch composed of the raw material was sufficiently melted without generating molten residues so that no partial melt was generated. Next, after raising the melted raw materials to a temperature of about 1350 to 1500° C., they were lowered to a temperature of 1450 to 1250° C., and defoaming and refining the glass were performed. Thereafter, glass of a predetermined amount maintaining the temperature without alteration was discharged, and formed into a disk shape with a diameter of about 67 mm and thickness of 0.95 mm by a direct pressing system in which an upper mold set to 300±100° C. and a lower mold set to Tg±50° C. are used. Next, in a case of using crystallized glass as the glass material, a setter made of ceramic of a disk shape and the glass disks thus obtained were piled together, and maintained at a nucleation temperature of 670° C. for 3 hours, after which they were maintained at a crystal growth temperature of 750° C. for 7 hours, thereby causing crystals to precipitate.

TABLE 1

| weight % | G1 | G2 | G3 | G4 | G5 | G6 | G7 |
|---|---|---|---|---|---|---|---|
| $SiO_2$ | 47.60 | 52.40 | 51.60 | 49.90 | 61.60 | 52.40 | 47.45 |
| $P_2O_5$ | 1.00 | 1.00 | 1.00 | 1.00 | 3.00 | 1.00 | 1.00 |
| $Al_2O_3$ | 18.00 | 17.00 | 12.00 | 16.00 | 8.00 | 17.00 | 16.00 |
| $B_2O_3$ | 1.00 | | 5.00 | 3.00 | 1.00 | | 3.00 |
| $Li_2O$ | | | | | 5.00 | | |
| $K_2O$ | | | | | 1.00 | | |
| $Na_2O$ | 4.00 | 4.00 | 6.00 | 4.00 | 6.00 | 4.00 | 4.00 |
| MgO | 8.00 | 6.00 | 5.00 | 6.25 | 2.00 | 6.00 | 6.25 |
| CaO | | 2.00 | 2.00 | 1.00 | 1.00 | 2.00 | 1.00 |
| BaO | | | | | | | 1.00 |
| ZnO | 14.00 | 12.00 | 12.00 | 12.75 | | 12.00 | 12.75 |
| $ZrO_2$ | | | | | 4.00 | | |
| $TiO_2$ | 6.00 | 5.00 | 5.00 | 5.50 | 7.00 | 5.00 | 5.50 |
| $Nb_2O_5$ | | | | | | | |
| $CeO_2$ | 0.40 | 0.60 | 0.40 | 0.60 | 0.40 | 0.60 | 0.60 |
| Total | 100.00 | 100.00 | 100.00 | 100.00 | 100.00 | 100.00 | 100.00 |
| Precipitated crystalline phase | Spinel-type compound | Spinel-type compound | Spinel-type compound | Spinel-type compound | Amorphous | Amorphous | Spinel-type compound |
| Degree of crystallization (mass %) | 5 | 5 | <1 | 3 | — | — | 5 |
| Crystal grain size (nm) | 5 | 3 | — | 3 | — | — | 3 |
| Young's modulus E (GPa) | 101 | 100 | 85 | 88 | 87 | 92 | 90 |
| Specific gravity | 2.87 | 2.80 | 2.70 | 2.8 | 2.53 | 2.75 | 2.82 |
| Vickers hardness Hv | 680 | 680 | 620 | 660 | 650 | 620 | 620 |
| Coefficient of thermal expansion ($\times 10^{-7}/°C$) | 53 | 52 | 52 | 56 | 76 | 42 | 56 |
| Fracture toughness | 1.3 | 1.9 | 1.8 | 1.6 | 0.6 | 0.7 | 1.3 |

Each entry of Table 1 represents the composition of crystallized glass and amorphous glass (percent by mass), specific gravity of the substrate after press molding, Vickers hardness, Young's modulus, average linear expansion coefficient (a) at 25° C. to 100° C., degree of crystallization (percent by mass), crystal grain size (nm), and maximum crystal grain size (nm).

In addition, the average linear expansion coefficient is a value measured by changing the temperature range from 25° C. to 100° C. in accordance with the JOGIS (Japan Optical Glass Industrial Society Standard) 16-2003 "Measuring Method for Average Linear Expansion Coefficient of Optical Glass at Normal Temperature".

The specific gravity was measured using Archimedes principle, and the Young's modulus was measured using an ultrasonic method.

The Vickers hardness is expressed by a value equal to a load (N), when an indentation of a pyramid shape is created in a test surface using a diamond square-based pyramid indentor having an included angle of 136°, divided by the surface area ($mm^2$) calculated from indentation lengths. Using a microscopic hardness tester MVK-E made by Akashi Seisakusho, Ltd., a test load of 4.90 (N) was applied and held for 15 seconds.

Preprocessing

Next, chamfering and shaping were carried out by drilling a hole with a diameter of 18.7 mm in a central portion using a core drill, and end lapping of an outer-circumferential portion and an inner-circumferential portion.

Lapping Process

1) Sub-process of First Stage

The lapping process was performed with a 16B Double Side Lapping-and-Polishing machine made by Speedfam Co., Ltd. using one of #1000 diamond pellets or a diamond pad. It should be noted that this sub-process of the first stage may be omitted, and the lapping process may be made only the final sub-process.

2) Sub-process of Second Stage (Final Sub-process or Only Lapping Process)

The lapping process was performed with a 16B Double Side Lapping-and-Polishing machine made by Speedfam Co., Ltd. using a diamond pad.

Inner- and Outer-Circumference Polishing Process

After the lapping process, the surfaces of edge faces of the inner and outer circumferences were polished to smoothness.

Polishing Process

1) Sub-process of First Stage

The polishing process of the first stage was performed with a 16B Double Side Lapping-and-Polishing machine made by Speedfam Co., Ltd. using a polishing pad of hard urethane foam (hardness 90), and supplying polishing slurry containing loose grains. It should be noted that the sub-process of the first stage may be omitted, and the polishing process may be made only the final sub-process.

2) Sub-process of Second Stage (Final Sub-process or Only Polishing Process)

The polishing process of the second stage was performed with a 16B Double Side Lapping-and-Polishing machine made by Speedfam Co., Ltd. using a polishing pad made of suede while supplying polishing slurry containing loose grains.

Other processing conditions and the processing results are shown in Tables 2 to 5. In the tables, in a case of diamond pellets, the grit of the grains of pellets is shown, and in a case of a diamond pad, the average grain size of the diamond particles is shown. In addition, polishing processes performed after the lapping process of the present invention had been completed and the results thereof are shown in Tables 2 to 5.

TABLE 2

| | | Example No. | 1 | 2 | 3 | 4 | 5 |
|---|---|---|---|---|---|---|---|
| | | Glass material | G1 | G1 | G2 | G2 | G2 |
| | | Plate thickness before lapping (mm) | 1 | 0.85 | 0.85 | 0.85 | 0.85 |
| Lapping process | First stage | | Diamond pellets #1000 | Diamond pad 4 μm | Diamond pad 9 μm | Diamond pad 9 μm | Diamond pad 9 μm |
| | | Processing pressure (kPa) | 4 | 6 | 4 | 4 | 4 |
| | | Revolution speed (rpm) | 25 | 30 | 30 | 30 | 30 |
| | | Processing rate (μm/min) | 14 | 10 | 25 | 25 | 25 |
| | | Ra after processing (μm) | 0.5 | 0.08 | 0.18 | 0.18 | 0.18 |
| | | Plate thickness after lapping (mm) | 0.785 | 0.785 | 0.785 | 0.785 | 0.785 |
| | Second stage | | Diamond pad 4 μm | Diamond pad 2 μm | Diamond pad 4 μm | Diamond pad 4 μm | Diamond pad 4 μm |
| | | Processing pressure (kPa) | 4 | 5 | 4 | 4 | 4 |
| | | Revolution speed (rpm) | 30 | 30 | 30 | 30 | 30 |
| | | Processing rate (μm/min) | 6 | 5 | 7 | 7 | 7 |
| | | Ra after processing (μm) | 0.04 | 0.012 | 0.05 | 0.05 | 0.05 |
| | | Plate thickness after lapping (mm) | 0.675 | 0.675 | 0.675 | 0.675 | 0.675 |
| Polishing process | First stage | | Hard urethane foam | Hard urethane foam | Hard urethane foam | Hard urethane foam | Hard urethane foam |
| | | Polishing agent; average grain size | Cerium oxide 0.5 μm | Cerium oxide 0.5 μm | Cerium oxide 0.5 μm | Cerium oxide 0.5 μm | Cerium oxide 0.5 μm |
| | | Polishing slurry pH | 10 | 10 | 10 | 11 | 11 |
| | | Processing pressure (kPa) | 12 | 12 | 12 | 12 | 12 |
| | | Revolution speed (rpm) | 35 | 35 | 35 | 35 | 35 |
| | | Processing rate (μm/min) | 0.4 | 0.4 | 0.5 | 0.6 | 0.5 |
| | | Ra after processing (Å) | 3 | 2.7 | 3 | 3 | 3 |
| | | Plate thickness after processing (mm) | 0.655 | 0.655 | 0.655 | 0.639 | 0.655 |
| | Second stage | Polishing agent; grain size distribution | Soft suede Colloidal silica 10~100 nm | Soft suede Colloidal silica 10~100 nm | Soft suede Colloidal silica 10~100 nm | Soft suede Colloidal silica 10~100 nm | Soft suede Colloidal silica 10~100 nm |
| | | Polishing slurry pH | 2 | 2 | 4 | 4 | 10 |
| | | Processing pressure (kPa) | 10 | 10 | 10 | 10 | 10 |
| | | Revolution speed (rpm) | 25 | 25 | 25 | 25 | 25 |
| | | Processing rate (μm/min) | 0.08 | 0.08 | 0.06 | 0.06 | 0.08 |
| | | Ra after processing (Å) | 0.9 | 0.8 | 1 | 1.2 | 1 |
| | | Appearance after final polishing | Smooth surface | Smooth surface | Smooth surface | Smooth surface | Smooth surface |

TABLE 3

| | | Example No. | 6 | 7 | 8 | 9 | 10 |
|---|---|---|---|---|---|---|---|
| | | Glass material | G3 | G3 | G4 | G4 | G4 |
| | | Plate thickness before lapping (mm) | 0.85 | 0.85 | 0.8 | 0.85 | 0.85 |
| Lapping process | First stage | | Diamond pad 6 μm | Diamond pad 4 μm | — | Diamond pad 9 μm | Diamond pad 4 μm |
| | | Processing pressure (kPa) | 4 | 6 | — | 4 | 6 |
| | | Revolution speed (rpm) | 30 | 30 | — | 30 | 30 |
| | | Processing rate (μm/min) | 20 | 14 | — | 25 | 14 |
| | | Ra after processing (μm) | 0.12 | 0.07 | — | 0.18 | 0.07 |
| | | Plate thickness after lapping (mm) | 0.785 | 0.785 | — | 0.785 | 0.785 |
| | Second stage | | Diamond pad 4 μm | Diamond pad 2 μm | Diamond pad 4 μm | Diamond pad 4 μm | Diamond pad 2 μm |
| | | Processing pressure (kPa) | 4 | 5 | 5 | 4 | 6 |
| | | Revolution speed (rpm) | 30 | 30 | 30 | 30 | 30 |
| | | Processing rate (μm/min) | 8 | 5 | 10 | 7 | 5 |
| | | Ra after processing (μm) | 0.05 | 0.008 | 0.05 | 0.05 | 0.008 |
| | | Plate thickness after lapping (mm) | 0.675 | 0.639 | 0.675 | 0.675 | 0.639 |
| Polishing process | First stage | | Hard urethane foam | — | Hard urethane foam | Hard urethane foam | — |
| | | Polishing agent; average grain size | Cerium oxide 0.5 μm | — | Cerium oxide 0.5 μm | Cerium oxide 0.5 μm | — |
| | | Polishing slurry pH | 11 | — | 10 | 10 | — |
| | | Processing pressure (kPa) | 12 | — | 12 | 12 | — |

TABLE 3-continued

| | | Example No. | 6 | 7 | 8 | 9 | 10 |
|---|---|---|---|---|---|---|---|
| | | Revolution speed (rpm) | 35 | — | 35 | 35 | — |
| | | Processing rate (μm/min) | 0.6 | — | 0.4 | 0.4 | — |
| | | Ra after processing (Å) | 3 | — | 3 | 3 | — |
| | | Plate thickness after processing (mm) | 0.655 | — | 0.645 | 0.655 | — |
| | Second stage | Polishing agent; grain size distribution | Soft suede Colloidal silica 10~100 nm | Soft suede Colloidal silica 10~100 nm | Soft suede Colloidal silica 10~100 nm | Soft suede Colloidal silica 10~100 nm | Soft suede Colloidal silica 10~100 nm |
| | | Polishing slurry pH | 10 | 2 | 2 | 10 | 10 |
| | | Processing pressure (kPa) | 10 | 10 | 10 | 10 | 10 |
| | | Revolution speed (rpm) | 25 | 25 | 25 | 25 | 25 |
| | | Processing rate (μm/min) | 0.09 | 0.09 | 0.08 | 0.12 | 0.12 |
| | | Ra after processing (Å) | 0.7 | 1.3 | 0.7 | 1 | 0.8 |
| | | Appearance after final polishing | Smooth surface | Smooth surface | Smooth surface | Smooth surface | Smooth surface |

TABLE 4

| | | Example No. | 11 | Comparative Example 1 | Comparative Example 2 | Comparative Example 3 |
|---|---|---|---|---|---|---|
| | | Glass material | G6 | G1 | G1 | G5 |
| | | Plate thickness before lapping (mm) | 0.85 | 0.85 | 0.85 | 1.15 |
| Lapping process | First stage | | Diamond pad 9 μm | Diamond pellets #1000 | Diamond pad 9 μm | Alumina loose grains #800 |
| | | Processing pressure (kPa) | 4 | 4 | 4 | 6 |
| | | Revolution speed (rpm) | 30 | 25 | 30 | 30 |
| | | Processing rate (μm/min) | 10 | 14 | 25 | 20 |
| | | Ra after processing (μm) | 0.18 | 0.5 | 0.18 | 0.25 |
| | | Plate thickness after lapping (mm) | 0.785 | 0.785 | 0.785 | 0.756 |
| | Second stage | | Diamond pad 4 μm | Diamond pad 4 μm | Diamond pad 4 μm | Diamond pad 4 μm |
| | | Processing pressure (kPa) | 6 | 4 | 4 | 4 |
| | | Revolution speed (rpm) | 30 | 30 | 30 | 30 |
| | | Processing rate (μm/min) | 5 | 6 | 7 | 4 |
| | | Ra after processing (μm) | 0.08 | 0.04 | 0.05 | 0.098 |
| | | Plate thickness after lapping (mm) | 0.675 | 0.675 | 0.675 | 0.656 |
| Polishing process | First stage | | Hard urethane foam | Hard urethane foam | Hard urethane foam | |
| | | Polishing agent; average grain size | Cerium oxide 0.5 μm | Cerium oxide 0.5 μm | Cerium oxide 0.5 μm | |
| | | Polishing slurry pH | 10 | 8 | 6 | |
| | | Processing pressure (kPa) | 12 | 12 | 12 | |
| | | Revolution speed (rpm) | 35 | 35 | 35 | |
| | | Processing rate (μm/min) | 0.5 | 0.13 | 0.15 | |
| | | Ra after processing (Å) | 3 | 5 | 5 | |
| | | Plate thickness after processing (mm) | 0.655 | 0.655 | 0.655 | |
| | Second stage | Polishing agent; grain size distribution | Soft suede Colloidal silica 10~100 nm | Soft suede Colloidal silica 10~100 nm | Soft suede Colloidal silica 10~100 nm | |
| | | Polishing slurry pH | 2 | 4 | 6 | |
| | | Processing pressure (kPa) | 10 | 10 | 10 | |
| | | Revolution speed (rpm) | 25 | 25 | 25 | |
| | | Processing rate (μm/min) | 0.07 | 0.06 | 0.03 | |
| | | Ra after processing (Å) | 1.2 | 2 | 2.3 | |
| | | Appearance after final polishing | Smooth surface | Orange peel | Orange peel | |

TABLE 5

| | | Example No. | 12 | 13 | 14 | 15 | 16 |
|---|---|---|---|---|---|---|---|
| | | Glass material | G4 | G4 | G4 | G4 | G7 |
| | | Plate thickness before lapping (mm) | 0.890 | 0.850 | 0.870 | 0.890 | 0.940 |
| Lapping process | First stage | | Diamond pad 4 μm | Diamond pad 4 μm | Diamond pad 4 μm | Diamond pad 6 μm | Diamond pad 9 μm |

TABLE 5-continued

| | | Example No. | 12 | 13 | 14 | 15 | 16 |
|---|---|---|---|---|---|---|---|
| | | Processing pressure (kPa) | 4 | 4 | 4 | 4 | 4 |
| | | Revolution speed (rpm) | 30 | 30 | 30 | 30 | 30 |
| | | Processing rate (μm/min) | 10 | 10 | 10 | 10 | 10 |
| | | Ra after processing (μm) | 0.18 | 0.18 | 0.18 | 0.120 | 0.18 |
| | | Plate thickness after lapping (mm) | 0.845 | 0.815 | 0.830 | 0.865 | 0.875 |
| | Second stage | | Diamond pad 2 μm | Diamond pad 0.5 μm | Diamond pad 0.5 μm | Diamond pad 2 μm | Diamond pad 4 μm |
| | | Processing pressure (kPa) | 6 | 6 | 6 | 6 | 6 |
| | | Revolution speed (rpm) | 30 | 30 | 40 | 30 | 30 |
| | | Processing rate (μm/min) | 8 | 2 | 3 | 7 | 5 |
| | | Ra after processing (μm) | 0.015 | 0.003 | 0.005 | 0.009 | 0.045 |
| | | Plate thickness after lapping (mm) | 0.815 | 0.805 | 0.815 | 0.825 | 0.825 |
| Polishing process | First stage | | Hard urethane foam | — | Hard urethane foam | Hard urethane foam | Hard urethane foam |
| | | Polishing agent; average grain size | Cerium oxide 0.5 μm | — | Cerium oxide 0.5 μm | Cerium oxide 0.5 μm | Cerium oxide 0.5 μm |
| | | Polishing slurry pH | 10 | — | 10 | 10 | 10 |
| | | Processing pressure (kPa) | 12 | — | 12 | 12 | 12 |
| | | Revolution speed (rpm) | 35 | — | 35 | 35 | 35 |
| | | Processing rate (μm/min) | 0.7 | — | 0.7 | 0.9 | 0.8 |
| | | Ra after processing (Å) | 3 | — | 2 | 2 | 3 |
| | | Plate thickness after processing (mm) | 0..805 | | 0..803 | 0.805 | 0.805 |
| | Second stage | | Soft suede | Soft suede | Soft suede | Soft suede | Soft suede |
| | | Polishing agent; grain size distribution | Colloidal silica 10~100 nm | Colloidal silica 10~100 nm | Colloidal silica 10~100 nm | Colloidal silica 10~100 nm | Colloidal silica 10~100 nm |
| | | Polishing slurry pH | 2 | 2 | 2 | 2 | 2 |
| | | Processing pressure (kPa) | 10 | 10 | 10 | 10 | 10 |
| | | Revolution speed (rpm) | 25 | 25 | 25 | 25 | 25 |
| | | Processing rate (μm/min) | 0.03 | 0.12 | 0.12 | 0.07 | 0.07 |
| | | Ra after processing (Å) | 0.7 | 0.9 | 0.8 | 1.2 | 1.2 |
| | | Appearance after final polishing | Smooth surface | Smooth surface | Smooth surface | Smooth surface | Smooth surface |

What is claimed is:

1. A method of manufacturing a substrate for information storage media, comprising steps of:
preparing a glass material of a plate shape with a thickness of 0.7 mm to 1.2 mm comprising an $SiO_2$ component, $Al_2O_3$ component, and $R'_2O$ component, R' being at least one selected from the group consisting of Li, Na, and K; and
lapping the glass material, wherein
the step of lapping consists of only lapping the glass material with a diamond pad having 10 wt % or less of fixed diamond particles, the diamond particles having an average diameter in the range of 0.1 to 5 μm, and
surface roughness Ra after the step of lapping has been completed is in the range of 0.001 μm to 0.085 μm.

2. A method of manufacturing a substrate for information storage media according to claim 1, wherein the lapping step has a sub-step of lapping performed with the diamond pad having an average diameter of diamond particles in the range of 2 to 5 μm.

3. A method of manufacturing a substrate for information storage media according to claim 1, wherein the lapping step has a final sub-step of lapping performed with a diamond pad having an average diameter of diamond particles in the range of at least 0.1 μm to less than 2 μm.

4. A method of manufacturing a substrate for information storage media according to claim 1, wherein the glass material is a material that precipitates as a crystalline phase having crystals with a Mohs hardness in the range of at least 6 to less than 10.

5. A method of manufacturing a substrate for information storage media according to claim 1, wherein the glass material contains at least one selected from the group consisting of $MAl_2O_4$ and $M_2TiO_4$ as a main crystalline phase, with M being at least one selected from Zn, Mg, and Fe, and is a crystallized glass having a crystal grain size of the main crystalline phase in the range of 0.5 nm to 20 nm, and having a degree of crystallinity of no more than 15%.

6. A method of manufacturing a substrate for information storage media according to claim 1, wherein the glass material contains
40 to 60% of the $SiO_2$ component,
7 to 20% of the $Al_2O_3$ component, and
2 to 15% of the $R'_2O$ component, R' being at least one selected from the group consisting of Li, Na, and K, by mass on an oxide basis.

7. A method of manufacturing a substrate for information storage media according to claim 1, wherein the glass material contains
1 to 15% of $TiO_2$ component, and
5 to 35% of RO component, R being at least one selected from the group consisting of Mg, Ca, Sr, Ba, Zn, and Fe, by mass on an oxide basis.

8. A method of manufacturing a substrate for information storage media according to claim 1, wherein the glass material contains
5 to 25% of ZnO component by mass on an oxide basis.

9. A method of manufacturing a substrate for information storage media according to claim 1, wherein the step of lapping employs a double-sided lapping-and-polishing machine that holds and polishes a material to be ground between upper and lower pressure plates, wherein a maximum processing pressure thereof is in the range of 3 kPa to 6 kPa.

10. A method of manufacturing a substrate for information storage media according to claim 1, wherein a processing rate in the step of lapping is at least 5 µm per minute.

11. A method of manufacturing a substrate for information storage media according to claim 1, further comprising a step of polishing the glass material after the step of lapping, wherein polishing is performed in the step of polishing with a polishing slurry having a pH in the range of 1 to 5 or in the range of 9 to 13.

12. A method of manufacturing a substrate for information storage media according to claim 11, wherein the step of polishing includes a step of one stage.

13. A method of manufacturing a substrate for information storage media according to claim 11, wherein the step of polishing includes a sub-step of at least two stages, and
wherein a pH of a polishing slurry used in a sub-step of a first stage is in the range of 9 to 13.

14. A method of manufacturing a substrate for information storage media according to claim 11, wherein the polishing slurry used in at least one sub-step of the step of polishing contains loose grains of cerium oxide.

15. A method of manufacturing a substrate for information storage media according to claim 14, wherein the average grain size of loose grains of cerium oxide is in the range of 0.3 µm to 1 µm.

16. A method of manufacturing a substrate for information storage media according to claim 11, wherein the step of polishing employs a material containing loose grains of colloidal silica as a polishing slurry used in at least one sub-step.

17. A method of manufacturing a substrate for information storage media according to claim 16, wherein grain size of the loose grains of colloidal silica is in the range of 10 nm to 100 nm.

18. A method of manufacturing a substrate for information storage media according to claim 11, wherein the step of polishing employs a double-sided lapping-and-polishing machine that holds and polishes a material to be ground between upper and lower pressure plates, wherein a maximum processing pressure thereof is in the range of 8 kPa to 15 kPa.

19. A method of manufacturing a substrate for information storage media according to claim 11, wherein a processing rate in the step of polishing is in the range of 0.05 µm per minute to 1 µm per minute.

20. A method of manufacturing a substrate for information storage media according to claim 11, wherein surface roughness Ra after the step of polishing has been completed is no more than 1.5 Å.

* * * * *